United States Patent [19]

Roberts

[11] Patent Number: 5,150,206
[45] Date of Patent: Sep. 22, 1992

[54] VIDEO DISPLAY SYSTEM USING AN IMPROVED COLOR SIGNAL TECHNIQUE

[75] Inventor: Alan Roberts, Coulsdon, United Kingdom

[73] Assignee: British Broadcasting Corporation, London, England

[21] Appl. No.: 643,753

[22] Filed: Jan. 22, 1991

[30] Foreign Application Priority Data

Jan. 22, 1990 [GB] United Kingdom ............... 9001429

[51] Int. Cl.$^5$ ............................................. H04N 9/67
[52] U.S. Cl. ........................................ 358/30; 358/29
[58] Field of Search .................... 358/29, 30, 32, 37, 358/27

[56] References Cited

U.S. PATENT DOCUMENTS

| | | | |
|---|---|---|---|
| 3,429,987 | 2/1969 | Altmann | 358/30 |
| 3,588,827 | 6/1971 | Roessel et al. | 358/30 |
| 3,729,580 | 4/1973 | Schneider | 358/30 |
| 4,481,529 | 11/1984 | Kerling | 358/30 |

FOREIGN PATENT DOCUMENTS 2-166992 6/1990 Japan .
1025924 4/1966 United Kingdom .

OTHER PUBLICATIONS

The Multi-Linear Matrix for a Constant Luminance Colour Television System, Percival, Nov. 1963.
HDTV-A Chance to Enhance Television Colorimetry, Roberts, Feb. 1990.
High Definition Television Production Standard-An Opportunity for Optimal Color Processing, Schäfer, SMPTE Journal Jul. 1985, pp. 749-758.

Primary Examiner—Edward L. Coles, Sr.
Assistant Examiner—Kim Yen Vu
Attorney, Agent, or Firm—Robert F. O'Connell

[57] ABSTRACT

A video display system such as a broadcast receiver or a studio monitor is designed to display both MAC-type input signals and HDTV-type input signals, only the latter being of constant luminance type. For MAC signals a normal Y, U, V to R, G, B, decoder matrix is used comprising amplifiers (18, 20, 22) resistors (24A, 24B, 26A, 26B, 28A, 28B, ) and further amplifiers (24, 26, 28). The output is applied to a CRT display device (30) having a conventional gamma factor. For HDTV signals, the decoder matrix is augmented by a correction matrix having six or eight circuit sections. Each circuit section comprises resistors (42, 44, 46), an operational amplifier (40), and circuitry including diodes (48, 50) for selecting the output only over a portion of the permissible color range.

15 Claims, 10 Drawing Sheets

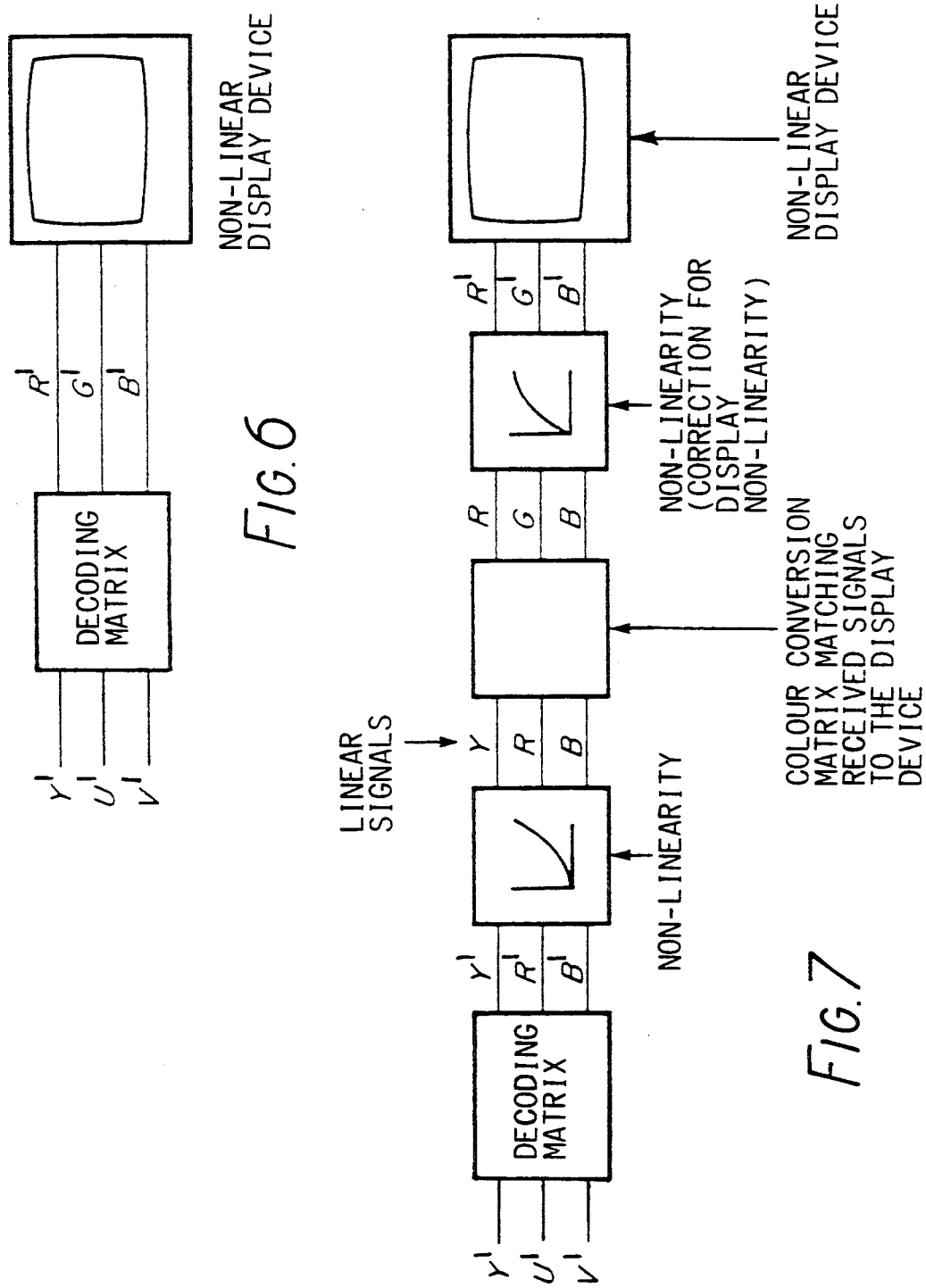

VIDEO DISPLAY SYSTEM USING AN IMPROVED COLOR SIGNAL TECHNIQUE

BACKGROUND OF THE INVENTION

This invention relates to video display systems, for use for example in broadcast television receivers and studio monitors.

It has been proposed to make the proposed high definition television (HDTV) system a "constant luminance" system, and at the same time to increase the transmissible colours as compared with conventional television systems (PAL, NTSC, etc.)

However it would be desirable to provide a degree of compatibility with the MAC television system proposals at least to the extent of allowing a common receiver to display both HDTV and MAC originating signals. MAC is not a constant luminance system and thus there is an inherent incompatibility. It has been proposed, however, to alter the colour primaries in the HDTV system such that a picture of adequate quality would be displayed on a MAC receiver, the "errors" produced by the different primaries compensating to some extent for the differences between the constant luminance HDTV and the non-constant luminance MAC systems.

This however produces serious problems for monitors in the television studio. The monitors have to be considerably more complex and thus expensive.

The Percival Proposal

A paper by Percival, W.S. 1963, "The multi-linear matrix for a constant-luminance colour television system", EMI Report No. B.389, November 1963, from The Research Laboratories of Electric & Municipal Industries Ltd., Hayes, Middlesex, England, describes what has been termed a "multi-linear matrix". Such a multi-linear matrix is well adapted to an analogue implementation. As the paper is not known to have been published in print, a description of such a matrix, taken from the above paper, will now be given, with grateful acknowledgement. The principle is discussed in the context of decoding of a conventional N.T.S.C. signal encoded with a gamma factor.

If R, G, B represent the red, green and blue primaries as specified by the N.T.S.C. and the voltages $E_R$, $E_G$, $E_S$ are respectively proportional to R, G, B, the luminance signal is given by $$E_Y = 0.3 E_R + 0.59 E_G + 0.11 E_S \qquad (1)$$

If the correct luminance is to be displayed on the receiver tube for both monochrome and colour, it is required to transmit the three signals $$E_Y^{1/\gamma}; \; E_B^{1/\gamma} - E_Y^{1/\gamma}; \; E_R^{1/\gamma} - E_Y^{1/\gamma} \qquad (2)$$

where $\gamma$ is the gamma factor and, for simplicity, no distinction is made between full bandwidth and narrow bandwidth signals. The signals required for the colour receiver tube are $E_B^{1/\gamma}$, $E_R^{1/\gamma}$, $E_G^{1/\gamma}$. The first two can be obtained by simple addition, but the green signal can be obtained only by a non-linear transformation.

In order to simplify the treatment it will be assumed that $\gamma = 2$ and $$0.3 \, E_R = X^2 \qquad (3)$$
$$0.59 \, E_G = W^2$$
$$0.11 \, E_B = Z^2$$
$$E_Y = U^2$$

Then there are available $$X; Z; U = (X^2 + W^2 + Z^2)^{\frac{1}{2}} \qquad (4)$$

and W is the value required for the green signal. For a given luminance U will be constant so that:

$$X^2 + W^2 + Z^2 = U^2 \qquad (5)$$

which is the equation for a sphere, of which what is required is the octant given by positive values of X, W, Z.

The best single linear approximation to the octant of the sphere is a plane tangent at white. This can be obtained by linear matrixing, and gives correct luminance at white and in the neighbourhood of white. The octant and tangent plane are shown for U=1 in FIG. 1 of the drawings.

White on the sphere is given by $X = 0.55$, $W = 0.77$, and $Z = 0.33$ which are the square roots of the corresponding coefficients in Equation (1). It will be convenient to take W as vertical, so that white is written as (0.55, 0.33, 0.77) as shown in FIG. 1.

The equation for the plane tangent to the sphere $$X^2 + Z^2 + W^2 = 1 \qquad (6)$$

at white is $$0.55 X + 0.33 Z + 0.77 W = 1 \qquad (7)$$

which gives a value for W corresponding to the erroneous green signal $$E_V = 1.7 E_Y^{1/\gamma} - 0.51 E_R^{1/\gamma} - 0.19 E_B^{1/\gamma} \qquad (8)$$

obtained by linear matrixing, but with $\gamma = 2$ and $E_Y = 1$.

In FIG. 1, the correct values for white and for saturated colours are shown on the sphere, and the incorrect values on the tangent plane, which is, of course, bounded by the ellipse in which this plane cuts the cylinder $X^2 + Z^2 = 1$. This ellipse represents the line of saturated purples as it appears on the tangent plane, the point $P = (0.71, 0.71, 0.49)$ being in error by 0.49 in the W component. The error in $E_G$ at each point on the ellipse is equal to the square of the W component, while the error in $E_G$ on the W-axis is equal to the square of the W component minus unity.

The luminance $E_Y$ is equal to the square of the distance from the origin, i.e. to the sums of the squares of the components. The contours of constant luminance on any plane are circles, since they represent the intersection of the plane with spheres of constant luminance. The contours of constant luminance on the tangent plane of FIG. 1 are shown in FIG. 2, the values on each contour denoting $E_Y$. It will be understood that the calculated errors are those for $\gamma = 2$; for $\gamma = 2.2$ the errors will be somewhat greater.

Percival points out that a better approximation to the octant of a sphere can be obtained by using a number of planes. It is best to retain the tangent plane at white, but the additional planes can be allowed to cut the sphere in order to minimize the magnitude of the errors. One criterion would be to minimize the maximum error but, since the importance of a given error depends on its position in the colour triangle, weighting factors are required to obtain the best result. Thus particular care must be taken to reduce errors in the red corner of the triangle. A considerable improvement can be obtained by approximating to the sphere by means of four planes.

For a value of the luminance given by U the equation to the r th plane is of the form:

$$W_r = a_r U + b_r X + c_r Z \quad (9)$$

where, for the plane tangent at white, $a_r = 1.3$, $b_r = -0.71$, $c_r = -0.43$ For any given values of U, X and Z, a value of W will be given by each of the planes, whereas what is required is only the value of W for the plane closest to the sphere. It is easily seen that this is the lowest value of W as given by the various planes. It is therefore required to construct a network which, fed from voltages U, X and Z, will select the lowest value of W as given by equations of the form of Equation (9).

An appropriate network is the multi-linear matrix shown in FIG. 3 in which the conductance of each series resistor is proportional to the coefficient of the voltage applied to it as in Equation (9). The output of the minimizing set of diodes is then:

$$W = (0.59 \, E_G)^{1/\gamma} = (W_1, W_2 \ldots)\text{min}. \quad (10)$$

as required. Any linear transformations, such as would be required if the input signals were colour difference signals, can be obtained by changing the values of the corresponding conductances and, if necessary, reversing the signs of some of the input signals.

HDTV and MAC

At the transmitter or encoder there is little difference in signal processing terms between standard coding (e.g. MAC) and constant luminance coding (e.g. HDTV). FIG. 4 shows in block form a studio camera operating on the standard MAC system, and FIG. 5 shows a camera operating on the proposed HDTV system. A full description is not given here as these systems will be known to those skilled in the art; for further background information reference should be made to BBC Research Department Report 1990/2 published after the priority date of this application by BBC Research Department, Kingswood Warren, Tadworth, Surrey, KT20 6NP, England. It should be noted however that the constant-luminance camera can be expected to be less prone to source noise since the colour-correcting linear matrix coefficients will generally be smaller, because of the smaller negative lobes in the desired responses. Also the colour-correcting matrix and the luminance coding matrix can be combined.

The corresponding monitors or receivers do however exhibit significant differences. FIG. 6 shows a receiver for operating on the MAC standard whereas FIG. 7 shows a receiver for use in the proposed HDTV system with the same CRT display device. It will be seen that the HDTV display system is considerably more complicated than the MAC system in that it requires two non-linear (gamma-function) circuits, so that the colour conversion matrix can operate on "non-gamma" signals. While it is true that digital processing would enable these circuits to be implemented in programmable read-only memory, it may not be desired to convert into digital form, and even if it is it would be preferably to reduce circuit complexity if possible.

This then is one instance of a more general problem where signals which may be derived from a constant luminance signal source and a non-constant luminance signal source may be required to be displayed on the same display device.

SUMMARY OF THE INVENTION

In order to try to reduce the complexity of a picture monitor required to display both HDTV and MAC signals we propose to use a multi-linear matrix such as one based on the Percival proposal to convert Y, U, V or equivalent signals into R, G, B or similar form. Such a matrix can be chosen to have an approximation to the desired decoder characteristic.

Reference should be made to the appended claims and more particularly the independent claims in which the invention is defined.

A preferred example of a decoder embodying the invention is described in more detail below. In constructing the decoder, initially a non-constant-luminance decoder is constructed (i.e. colorimetry identical to that of the compatible picture); then a series of correction signals are added, to improve the colorimetry in areas of the spectrum where it departs to the greatest extent from that of an ideal constant-luminance decoder. In practice, an acceptable colourimetric performance can be achieved using six to eight such correction signals, for display via a CRT with present-day EBU phosphors.

BRIEF DESCRIPTION OF THE DRAWINGS

The preferred embodiment of the invention will be described in more detail below with reference to the drawings, in which:

FIG. 6 (referred to above) is a simplified block diagram of a MAC receiver or monitor;

FIG. 7 (referred to above) is a simplified block diagram of an HDTV receiver or monitor;

DETAILED DESCRIPTION OF THE PREFERRED EMBODIMENTS

Figure 8:
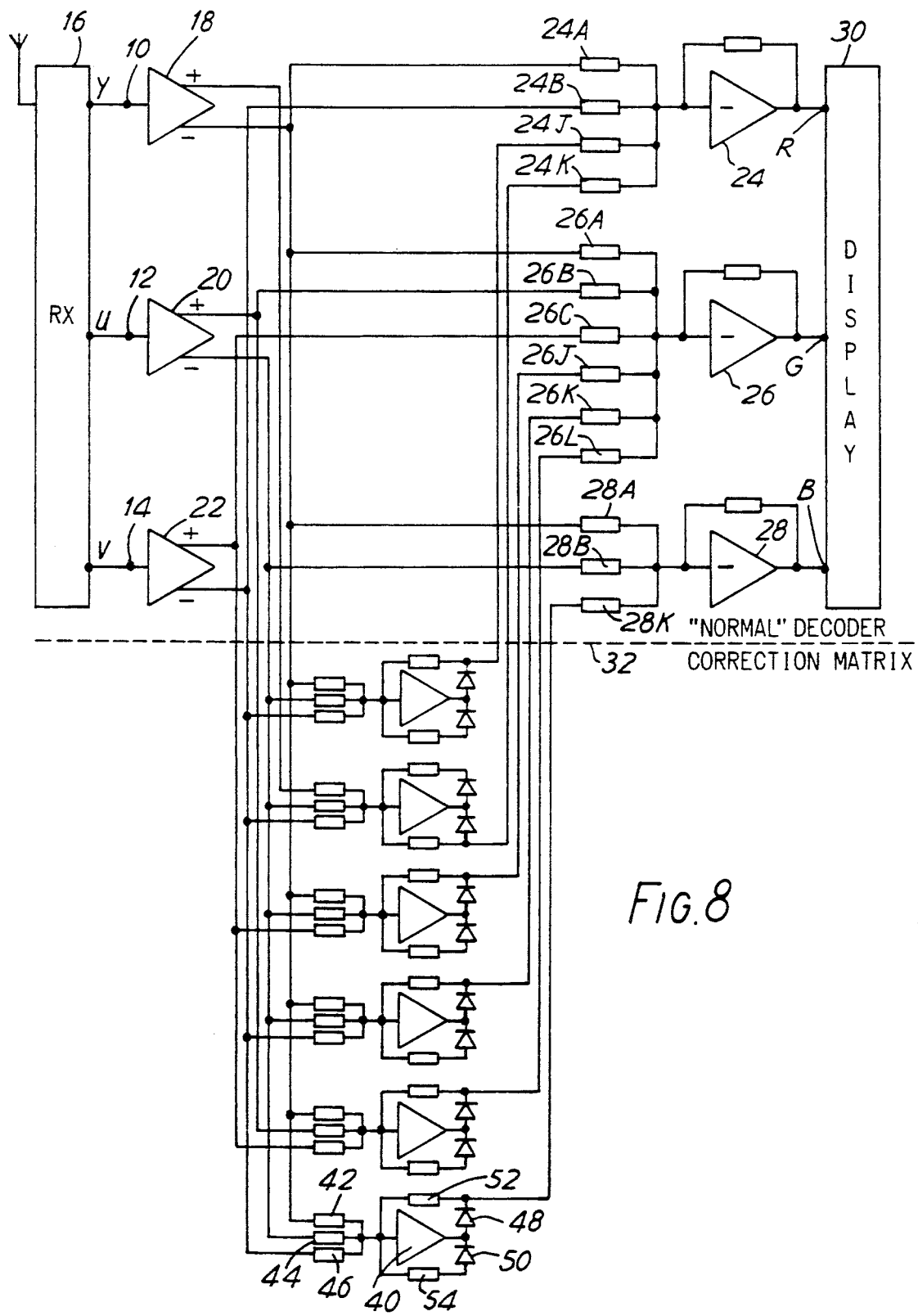
FIG. 8 is a circuit diagram of a first video display system incorporating a multi-linear matrix and embodying the invention.

The circuit of FIG. 8 has inputs 10, 12, 14 for luminance and colour separation signals Y, U and V in the PAL system which may be derived from HDTV or from MAC signals by appropriate receiver circuitry 16 of known type in each case. Alternatively where there is no receiver circuitry 16, the apparatus may constitute a studio monitor. The input signals are applied to buffer amplifiers 18, 20, 22 which provide both positive-going and inverted outputs. Three output amplifiers 24, 26, 28 are connected to the inputs such as to generate output signals by combining the Y and V signals in amplifier 24 to provide an R output signal for the red channel of the monitor 30, by combining the Y and U signals in amplifier 28 to provide a B output signal for the blue channel, and by combining the Y, U and V signals in amplifier 26 to provide a G output signal for the green channel. The signals are applied with appropriate weights or in appropriate proportions as determined by resistors 24A, 24B, 26A, 26B, 26C, 28A and 28B. As thus far described, that is as seen in FIG. 8 above the horizontal dashed line 32, the circuit comprises a conventional MAC or PAL-type decoder circuit.

Figure 1:
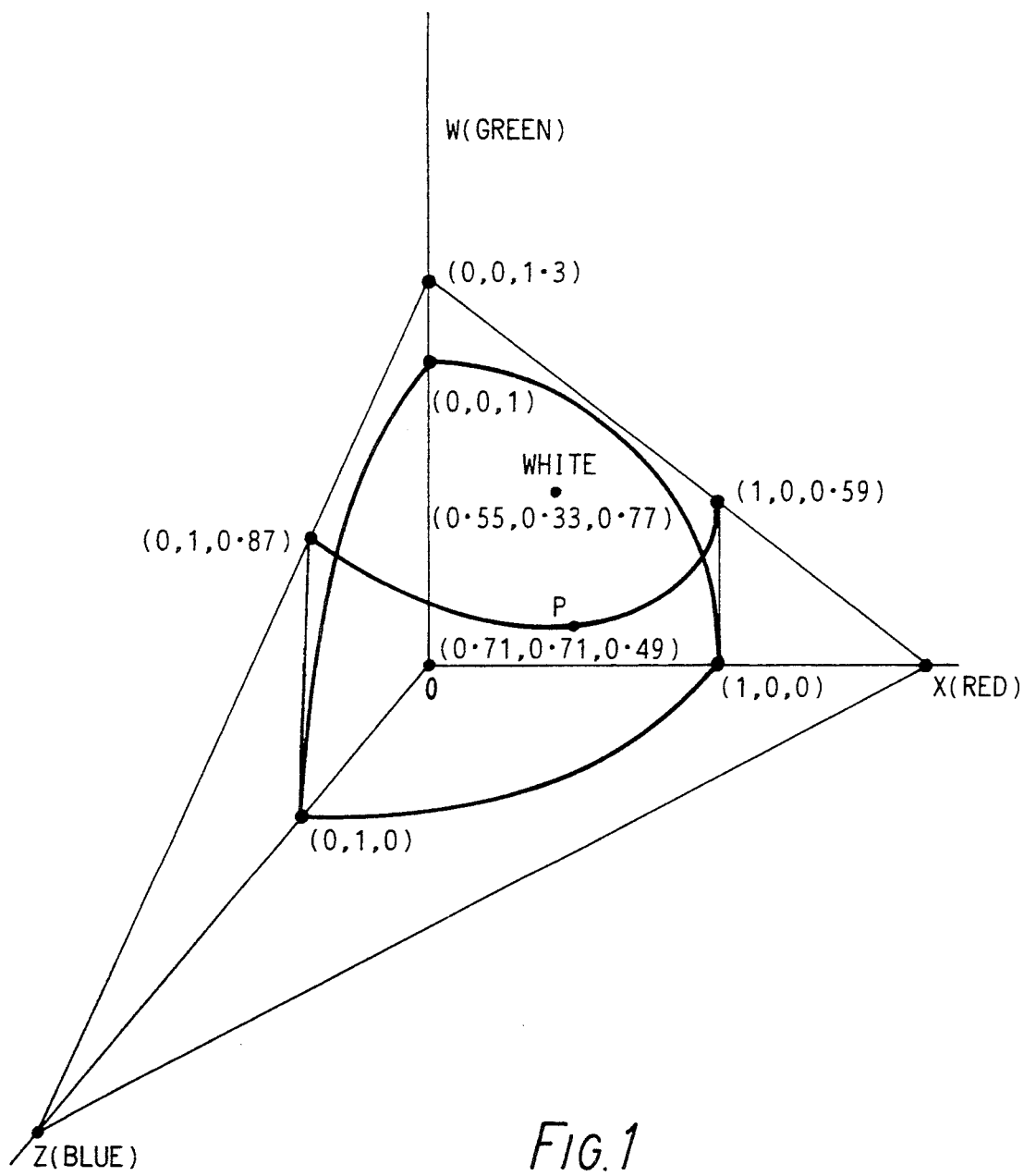
FIG. 1 (referred to above) shows an octant of a sphere and plane tangent at white, as discussed in the above-mentioned paper by Percival.
Figure 2:
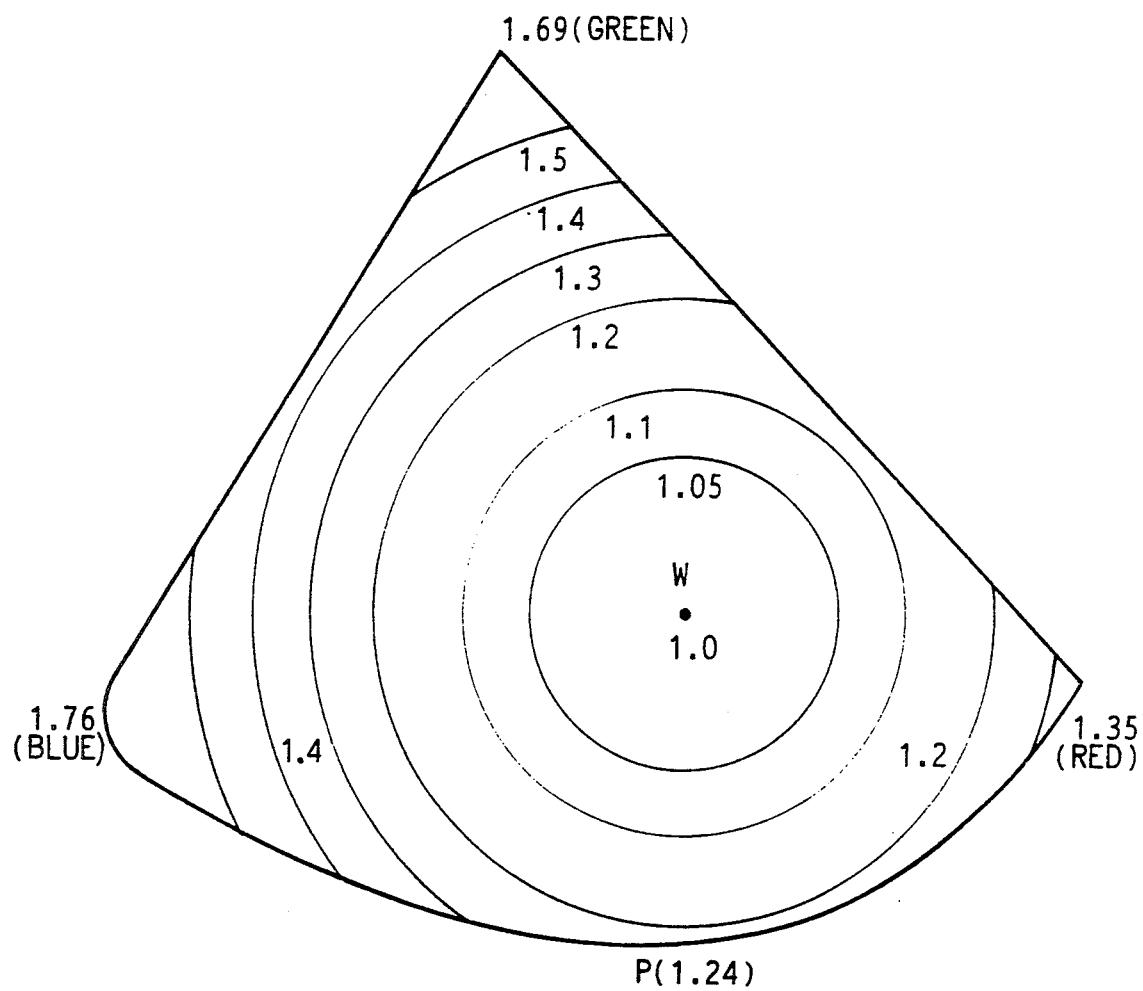
FIG. 2 (referred to above) shows circles of constant luminance on the plane.
Figure 3:
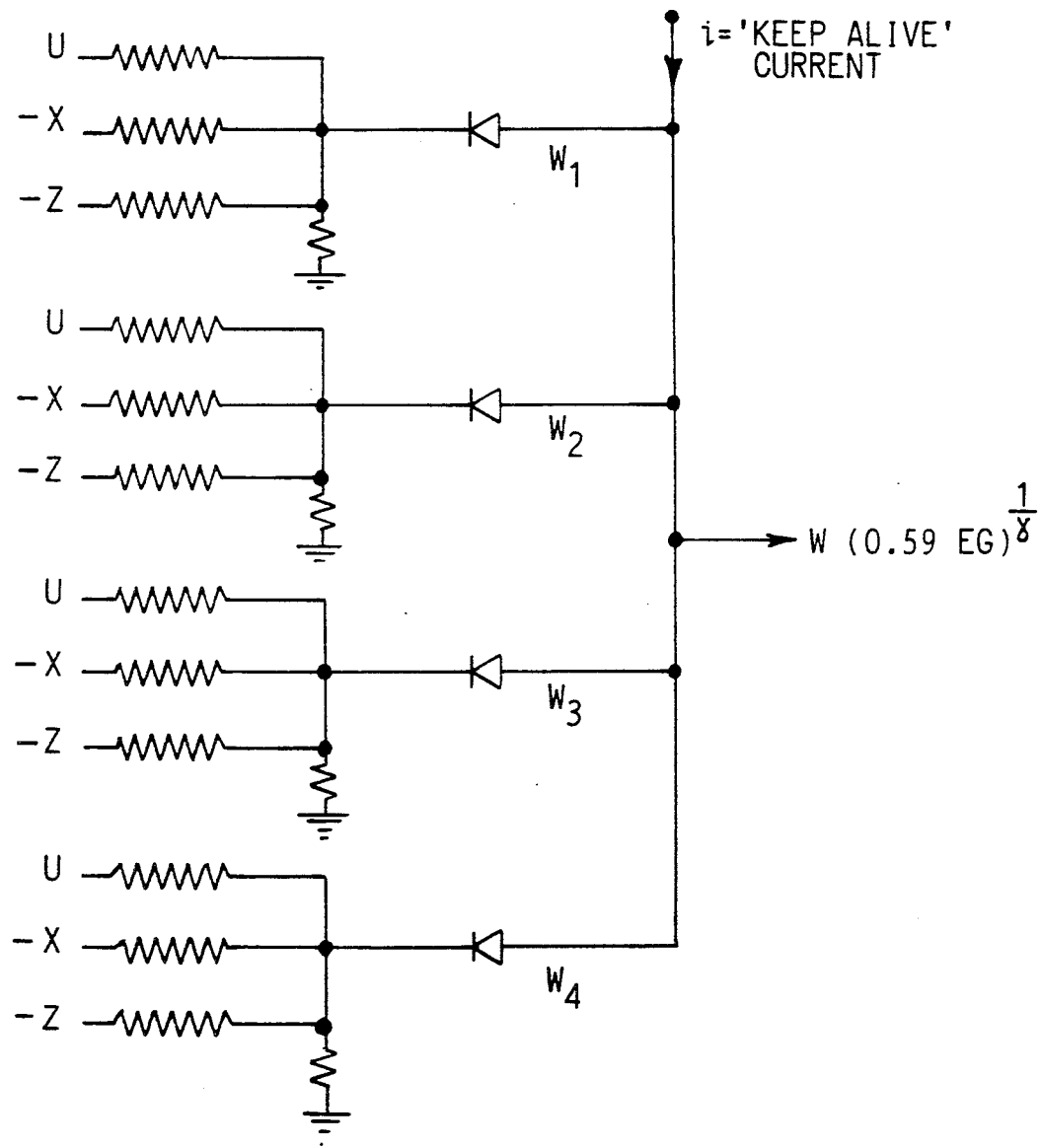
FIG. 3 (referred to above) is a circuit diagram of a simple multi-linear matrix of the type described in the paper.
Figure 4:
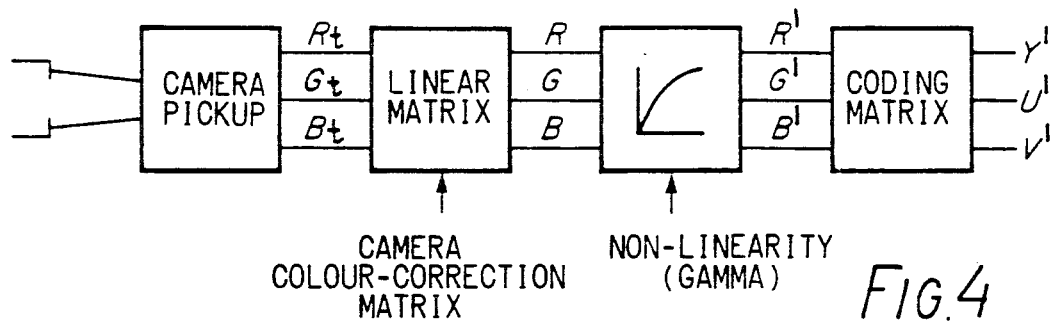
FIG. 4 (referred to above) is a simplified block diagram of a MAC studio camera.
Figure 5:
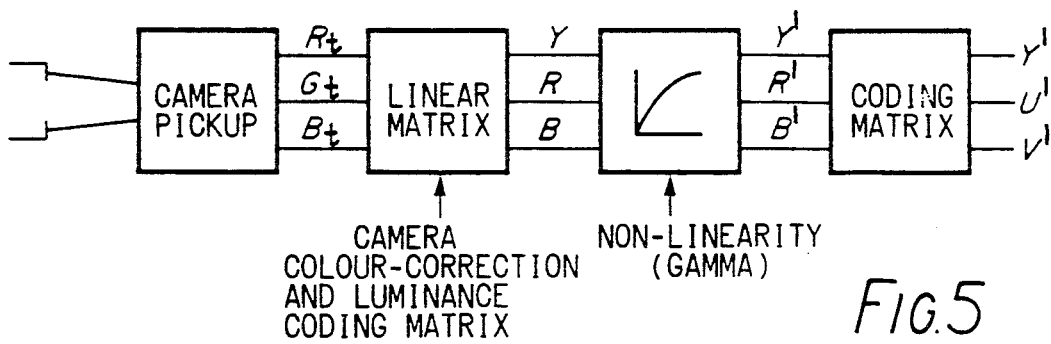
FIG. 5 (referred to above) is a simplified block diagram of an HDTV studio camera.

The lower part of FIG. 8 shows a correction matrix. This is used when the input signals are derived from an HDTV signal so as to make them broadly comparable with input signals derived from a MAC signal. Six circuit-sections are included, each corresponding to a different plane in each octant, as indicated in FIG. 1 and discussed by Percival.

Each circuit section comprises an operational amplifier 40 coupled through resistors 42, 44, 46 to mix three of the six outputs of amplifiers 18, 20, 22. Diodes 48, 50 and resistors 52, 54 couple the output and input of each amplifier 40; the diodes are present to ensure that correction signals are generated by that circuit section only if they are of one polarity; placing them in the feedback paths of the operational amplifiers ensure that they are used merely as switches, and that their forward resistance or bias voltage characteristics do not affect circuit operation. The correction signals are applied to amplifiers 24, 26, 28 through additional resistors 24J, 24K, 26J, 26K, 26L and 28J, to give the correct weighting factors.

Table A comprising sections A1, A2 and A3, appended to this specification indicates the level of performance achieved, for a range of real test colours. The figures show the true chromaticity co-ordinates of each test colour, the chromaticity co-ordinates of the compatible decoder, the colorimetry errors of the compatible decoder, the chromaticity co-ordinates of the corrected decoder and the colorimetry errors of the corrected decoder. It can be seen that a very significant improvement in the decoder colorimetry has been achieved by the use of the correction signals.

Figure 9:
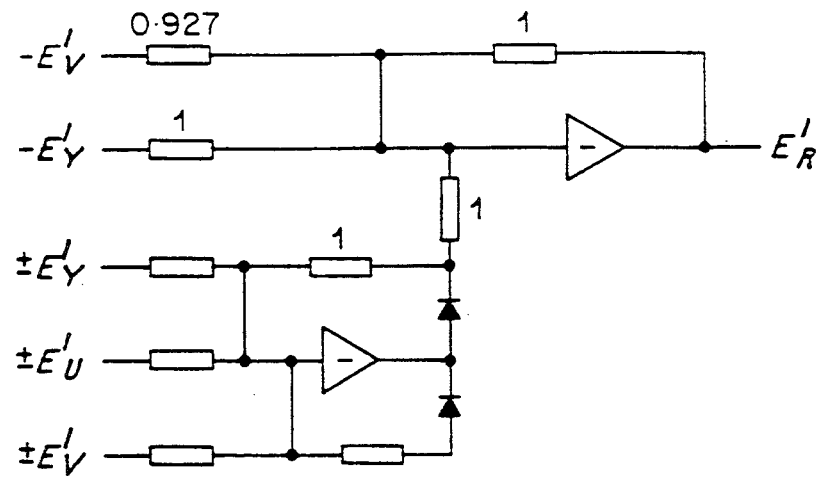
FIG. 9 is a circuit diagram of part of an improvement of the matrix of FIG. 8.

The multi-linear matrix aims to provide a variety of colour decoding matrices, each intended to produce good colorimetry over a restricted range of colours and luminances, using automatic selection of the appropriate matrix without recourse to logic switching. The appropriate matrix values have to be determined empirically. The solution we adopted was to find, by inspection, formulae operating on the transmitted signals Y', U' and V' which, after clipping at zero, could be added to the decoded R', G' and B' signals, such that the resulting modified signals were closer to the desired values R', G' and B'. The colorimetric significance of any error in these non-linear signals is deeply hidden, so in order to apply corrections only where they would do significant good, the results were continually analysed to show the colorimetric errors for the modified signals. The form of the electronics involved in such a practical solution is shown in FIG. 9, where the red signal is being modified by the output of a linear combination of Y', U' and V' which is rectified and thus operates only for a particular range of colours. In this way it is possible to perform corrections on particular colours, at specific ranges of luminance and saturation, while not affecting other colours at all.

For testing purposes an established set of 26 colours was used which contains colours of higher saturation, these being those used by the BBC in colour television camera analysis. Table B lists white and the test colours which were used to establish a numerical solution to this problem. Also listed are the colorimetric errors in reproduction by a theoretical standard MAC receiver decoding and displaying a constant-luminance coded HD-MAC signal. The errors are given in CIELUV values. The mean error is 4.98 $\delta E^*$ units and the worst colour is number 3 (Saturated Cyan) which has an error of 15.84 $\delta E^*$.

Table C below shows the test signals after coding in the constant-luminance wide-gamut coder, the compatible display drive signals produced by a conventional decoder operating on this constant-luminance coded signal, and the required drive signals for accurate reproduction of each colour using the standard MAC primaries. Note that only gamma-corrected signals are available in the compatible decoder.

Figure 10:
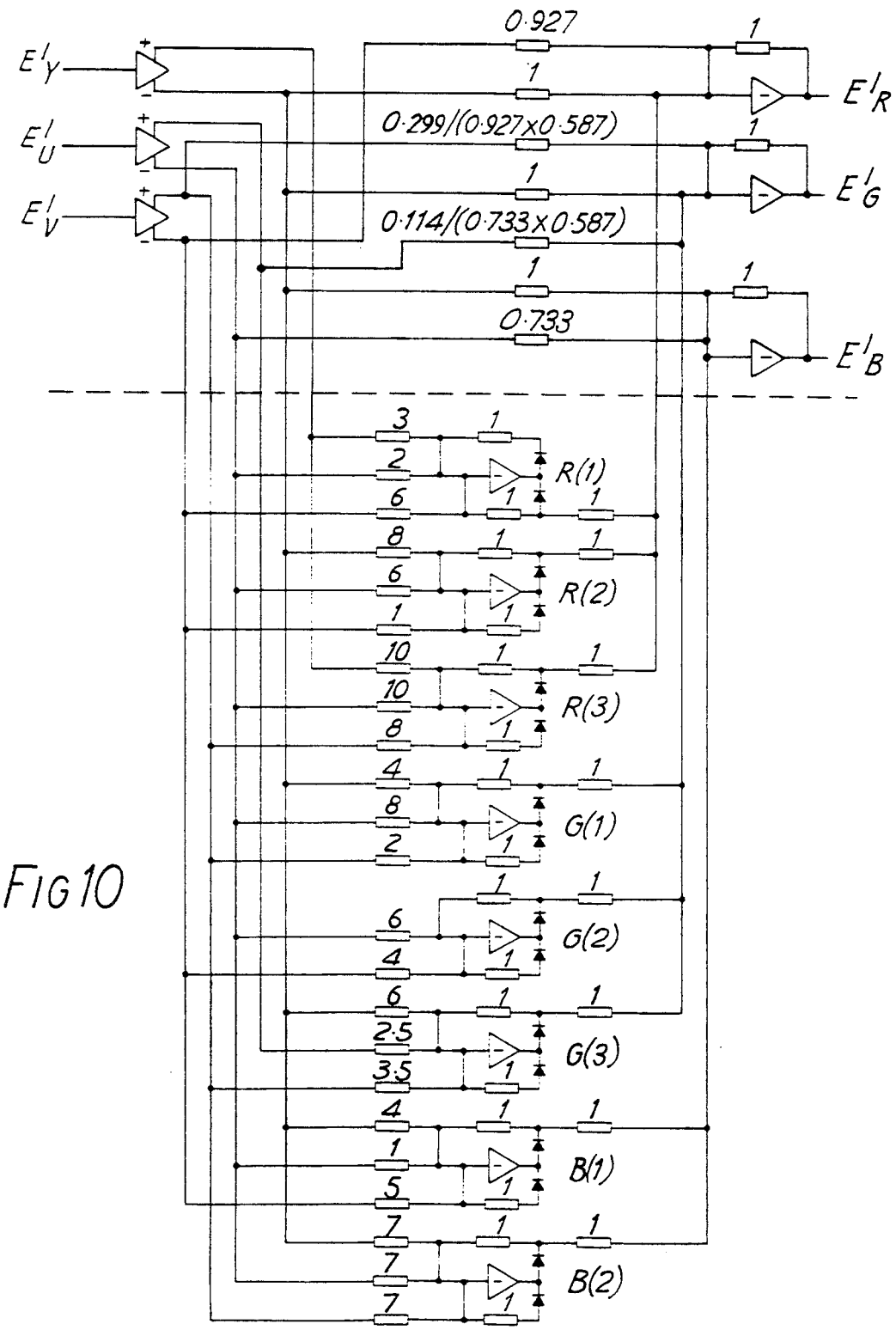
FIG. 10 is a circuit diagram of a second video display system incorporating a multi-linear matrix and embodying the invention.

As a result of this work, a preferred matrix of the form shown in FIG. 10 has been developed. Detailed description is not given in view of its close similarity to FIG. 8; it will also be noted that the necessary component values to give the required proportions are given on the figure. However, it will be seen that there are now eight circuit sections in the matrix, namely three for red and green, and two for blue. This corresponds to there being two additional planes in Percival's octant. The red signal is corrected mainly in saturated cyan and magenta, and the blue is corrected mainly in the yellow-/orange region and in saturated magenta. Green is corrected in saturated blue and orange/red, and also in green and orange/yellow, pink/magenta regions. Skin tones, foliage and grey scale are completely unaffected. The results of these corrections on the displayed colours are shown in full in Table D. The mean error is reduced to 2.90 $\delta E^*$ units, and the worst case colour is number 12 (Desaturated Green) which has an error of 7.39 $\delta E^*$ units.

The errors listed in Table D should be compared with those in Table B for the unmodified MAC decoder. This is not a unique solution and it is probable that more efficient formulae and a more effective solution can be found.

The correction formulae applied to the incoming HDTV signals are:

| Red | (1) | Y'/10 + U'/10 − V'/8 | when < 0 |
| Red | (2) | Y'/8 + U'/6 + V' | when < 0 |
| Red | (3) | −Y'/3 + U'/2 + V'/6 | when > 0 |

-continued

| | | | |
|---|---|---|---|
| Green | (1) | Y'/4 + U'/8 − V'/2 | when < 0 |
| Green | (2) | U'/6 + V'/4 | when < 0 |
| Green | (3) | Y'/6 − U'/2.5 − V'/3.5 | when < 0 |
| Blue | (1) | Y'/4 + U' + V'/5 | when < 0 |
| Blue | (2) | Y'/7 + U'/7 − V'/7 | when < 0 |

Figure 11:
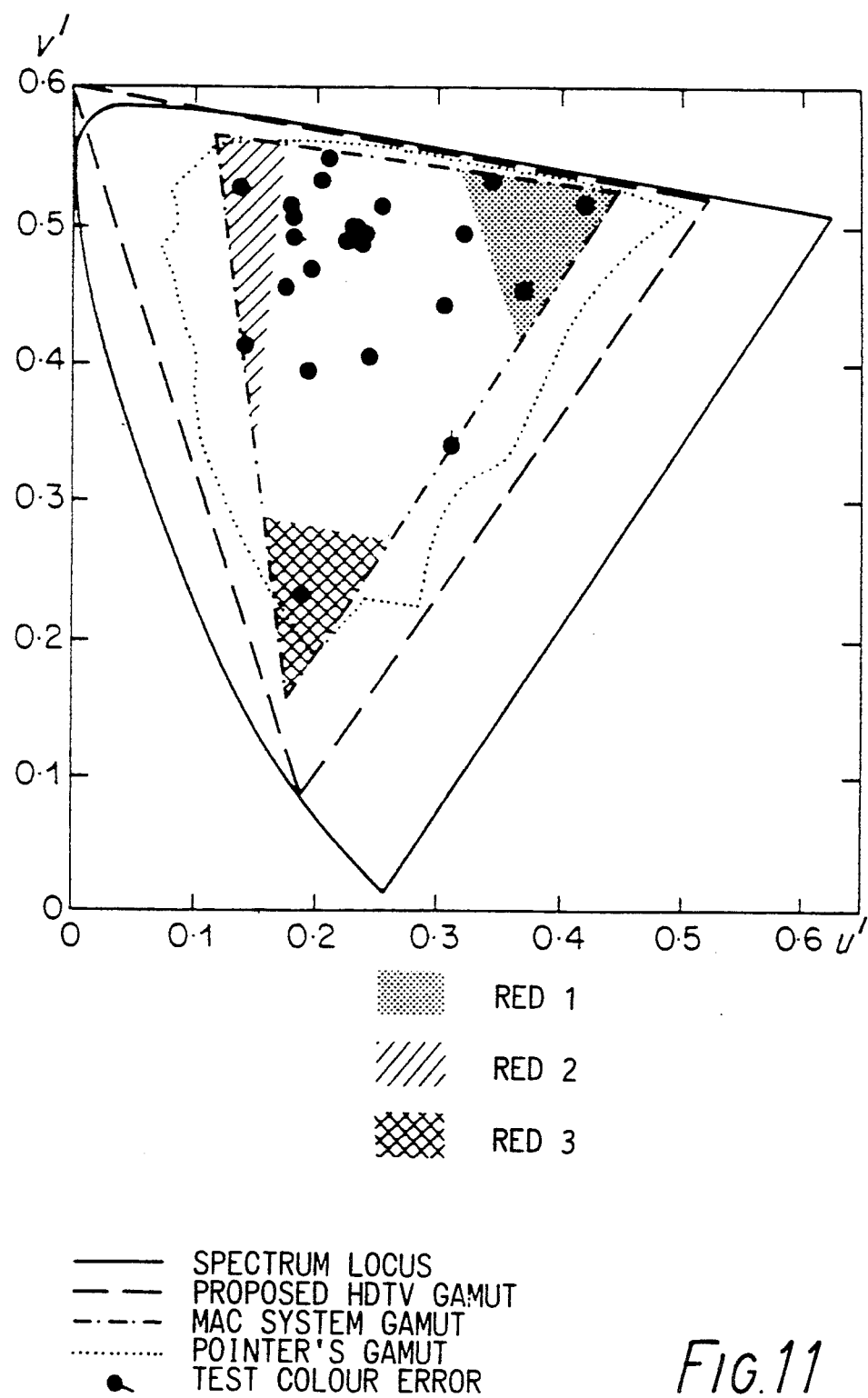
FIG. 11 is a CIE 1976 chromaticity diagram showing the areas of correction by the multi-linear matrix elements as applied to the red signal and the remaining colorimetric errors.
Figure 12:
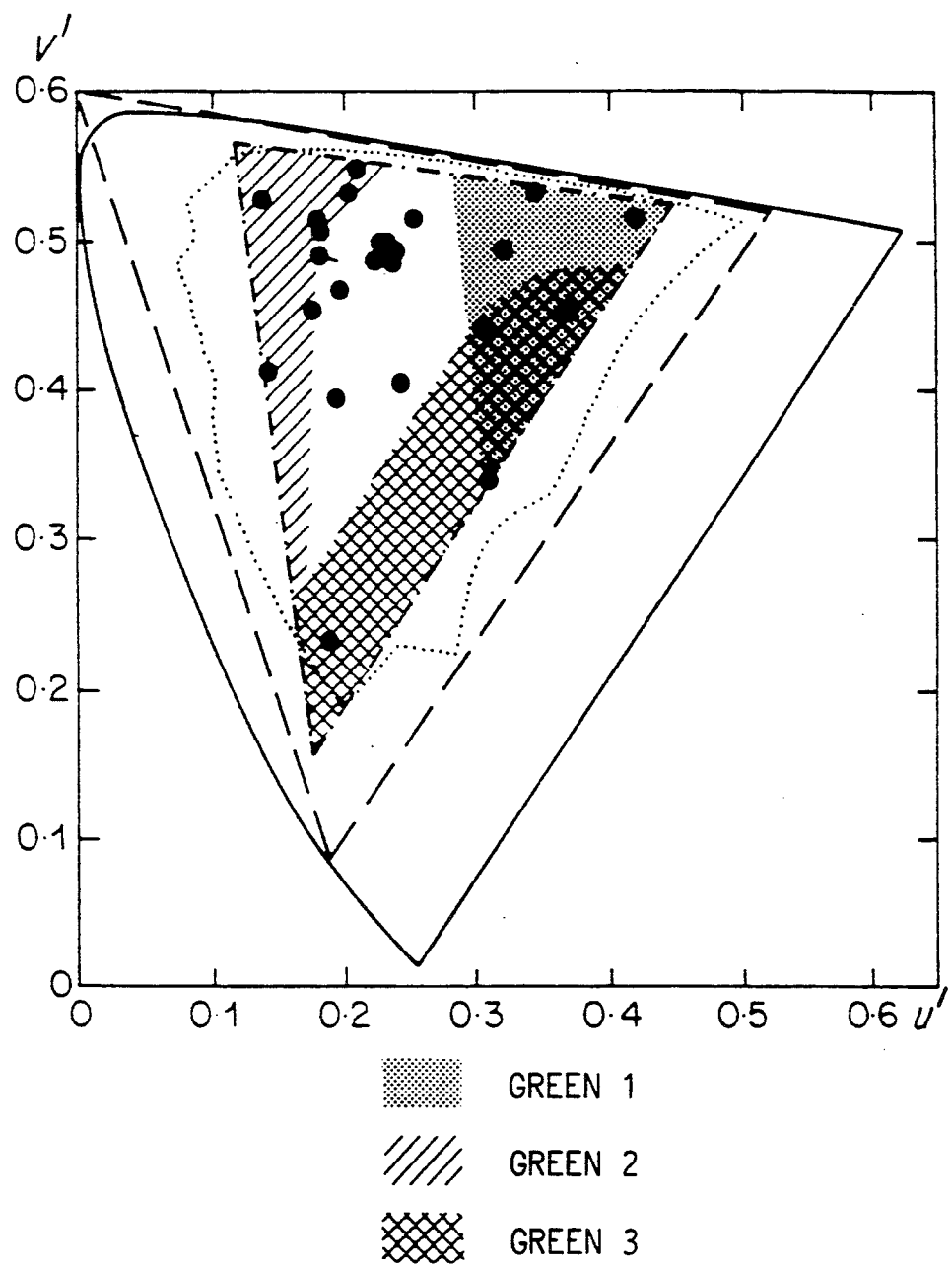
FIG. 12 is a similar diagram showing the areas of correction as applied to the green signal.
Figure 13:
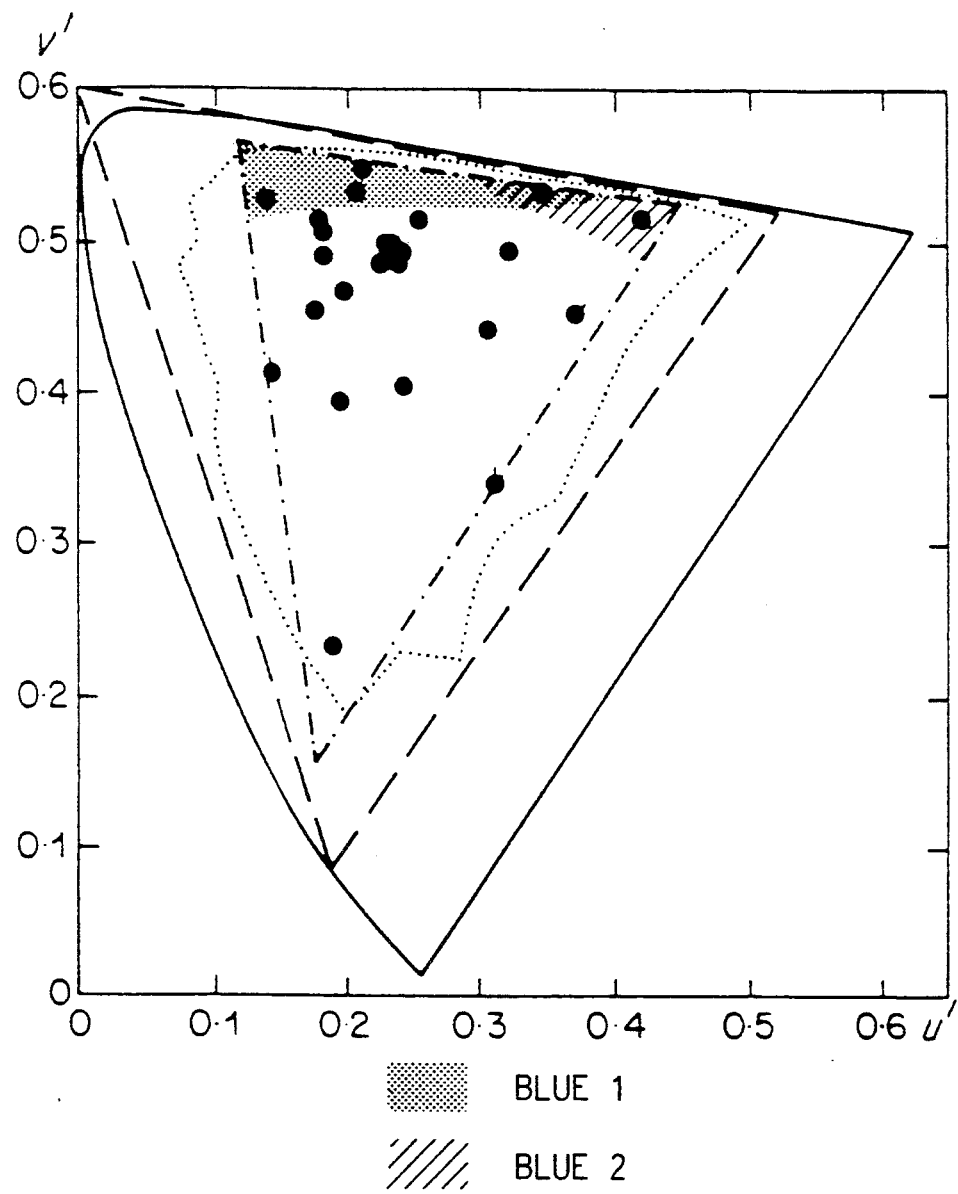
FIG. 13 is a similar diagram showing the areas of correction as applied to the red signal.

FIGS. 11, 12 and 13 are three chromaticity diagrams showing the areas in which each of the eight correcting signals are active and the colorimetric errors remaining after multi-linear matrix correction.

As well as allowing substantial savings to be made in the cost of studio monitors, the circuits of FIGS. 8 and 10 allow a reduction in receiver costs to be achieved. Analogue implementation of this circuit would be only approximately double the complexity of a compatible decoder.

It will be seen from the above that it is possible to design a television system which has an improved colour gamut and which obeys the constant-luminance principle in its coding, while retaining a considerable degree of compatibility with conventional decoders. The resulting pictures are sharper than for conventional coding, less prone to all sources of noise and permit linear transformation to suit any display primaries, thus making the system suitable for use at a time when display technology is advancing rapidly. The sharpness advantage is retained even when the signals are viewed on a conventional decoder, and noise performance is no worse than for conventional coding systems. Although the required decoder is necessarily more complex than a conventional system, advancing technology may render this irrelevant in the near future, and a simple additional circuit for conventional decoders to improve the degree of compatibility can be made.

TABLE A1

| | | Original colour | | |
|---|---|---|---|---|
| | | Y | u | v |
| 1 | White (D65) | 1.0000 | 0.1970 | 0.3122 |
| 2 | Saturated Blue | 0.0466 | 0.1006 | 0.1560 |
| 3 | Saturated Cyan | 0.3314 | 0.1400 | 0.2759 |
| 4 | Saturated Green | 0.3310 | 0.1357 | 0.3532 |
| 5 | Saturated Yellow | 0.7240 | 0.2093 | 0.3673 |
| 6 | Saturated Orange | 0.3101 | 0.3462 | 0.3566 |
| 7 | Saturated Red | 0.1506 | 0.4212 | 0.3439 |
| 8 | Saturated Pink | 0.2373 | 0.3700 | 0.3020 |
| 9 | Saturated Magenta | 0.1203 | 0.3113 | 0.2276 |
| 10 | Desaturated Blue | 0.3000 | 0.1924 | 0.2646 |
| 11 | Desaturated Cyan | 0.5675 | 0.1756 | 0.3049 |
| 12 | Desaturated Green | 0.4491 | 0.1771 | 0.3446 |
| 13 | Desaturated Yellow | 0.5979 | 0.2051 | 0.3572 |
| 14 | Desaturated Orange | 0.4506 | 0.2541 | 0.3436 |
| 15 | Desaturated Red | 0.1712 | 0.3213 | 0.3307 |
| 16 | Desaturated Pink | 0.1769 | 0.3060 | 0.2959 |
| 17 | Desaturated Magenta | 0.3470 | 0.2427 | 0.2709 |
| 18 | Skin Tone A | 0.4404 | 0.2221 | 0.3256 |
| 19 | Skin Tone B | 0.3936 | 0.2246 | 0.3272 |
| 20 | Skin Tone C | 0.3363 | 0.2200 | 0.3331 |
| 21 | Skin Tone D | 0.2124 | 0.2320 | 0.3339 |
| 22 | Skin Tone E | 0.1207 | 0.2397 | 0.3310 |
| 23 | Skin Tone F | 0.0600 | 0.2223 | 0.3259 |
| 24 | Skin Tone G | 0.3305 | 0.2330 | 0.3270 |
| 25 | Skin Tone H | 0.2922 | 0.2376 | 0.3250 |
| 26 | Light Foliage | 0.2330 | 0.1013 | 0.3394 |
| 27 | Dark Foliage | 0.0656 | 0.1001 | 0.3205 |
| 28 | EBU A | 0.0950 | 0.2539 | 0.3351 |
| 29 | EBU B | 0.3710 | 0.2357 | 0.3207 |
| 30 | EBU C | 0.3000 | 0.2304 | 0.3225 |
| 31 | EBU D | 0.2960 | 0.1039 | 0.3635 |
| 32 | EBU E | 0.3010 | 0.1640 | 0.3054 |
| 33 | EBU F | 0.3010 | 0.2067 | 0.2759 |
| 34 | EBU G | 0.1290 | 0.1004 | 0.3490 |
| 35 | EBU H | 0.1900 | 0.3246 | 0.3307 |

TABLE A1-continued

| | | Original colour | | |
|---|---|---|---|---|
| | | Y | u | v |
| 36 | EBU I | 0.4410 | 0.1520 | 0.3553 |
| 37 | EBU J | 0.1900 | 0.1770 | 0.2439 |
| 38 | EBU K | 0.0650 | 0.3002 | 0.3255 |
| 39 | EBU L | 0.2010 | 0.1471 | 0.3559 |
| 40 | EBU M | 0.0630 | 0.1706 | 0.2207 |
| 41 | EBU N | 0.4260 | 0.2757 | 0.3500 |
| 42 | EBU O | 0.1900 | 0.2307 | 0.2654 |

TABLE A2

| | Compatible decoder | | | Errors of compatible decoding | | |
|---|---|---|---|---|---|---|
| | Y | u | v | Y ind | c ind | $\delta E^*$ |
| 1 | 1.0000 | 0.1970 | 0.3122 | −0.0017 | 0.0007 | 0.0019 |
| 2 | 0.0527 | 0.1779 | 0.1700 | −6.2265 | 4.5919 | 4.0500 |
| 3 | 0.3907 | 0.1490 | 0.2092 | −9.3340 | 4.1760 | 6.7266 |
| 4 | 0.4193 | 0.1467 | 0.3526 | −11.9456 | 2.0772 | 13.2613 |
| 5 | 0.0062 | 0.2024 | 0.3615 | −5.4295 | 2.3527 | 14.7100 |
| 6 | 0.3556 | 0.3202 | 0.3536 | −5.6304 | 4.7594 | 12.2907 |
| 7 | 0.1074 | 0.3010 | 0.3466 | −11.0491 | 10.2933 | 14.3424 |
| 8 | 0.2710 | 0.3543 | 0.3111 | −6.6900 | 4.7252 | 5.7909 |
| 9 | 0.1437 | 0.2902 | 0.2417 | −5.7421 | 5.0077 | 4.9662 |
| 10 | 0.2940 | 0.1912 | 0.2654 | 1.0276 | 0.3316 | 2.3043 |
| 11 | 0.5926 | 0.1769 | 0.3074 | −2.1076 | 0.7200 | 1.7550 |
| 12 | 0.4929 | 0.1775 | 0.3436 | −4.7009 | 0.2770 | 6.1614 |
| 13 | 0.6441 | 0.2012 | 0.3535 | −3.7622 | 1.4015 | 0.9301 |
| 14 | 0.4610 | 0.2519 | 0.3412 | −0.3467 | 0.0455 | 3.2705 |
| 15 | 0.1776 | 0.3175 | 0.3314 | −1.0491 | 1.0010 | 1.7067 |
| 16 | 0.1704 | 0.3062 | 0.2906 | −0.4315 | 0.7204 | 1.3500 |
| 17 | 0.3271 | 0.2429 | 0.2693 | 3.0930 | 0.4239 | 3.4247 |
| 18 | 0.4340 | 0.2210 | 0.3243 | 0.6440 | 0.3550 | 0.7074 |
| 19 | 0.3000 | 0.2242 | 0.3250 | 0.6206 | 0.3023 | 0.0596 |
| 20 | 0.3346 | 0.2271 | 0.3314 | 0.2495 | 0.4913 | 1.4156 |
| 21 | 0.2111 | 0.2311 | 0.3322 | 0.3010 | 0.5114 | 1.1000 |
| 22 | 0.1190 | 0.2393 | 0.3293 | 0.7177 | 0.4406 | 0.6076 |
| 23 | 0.0679 | 0.2219 | 0.3246 | 0.6301 | 0.3590 | 0.3370 |
| 24 | 0.3251 | 0.2320 | 0.3263 | 0.0370 | 0.4066 | 0.7594 |
| 25 | 0.2060 | 0.2377 | 0.3243 | 1.0072 | 0.3977 | 0.6206 |
| 26 | 0.2516 | 0.1015 | 0.3309 | −3.7002 | 0.1476 | 3.0193 |
| 27 | 0.0695 | 0.1000 | 0.3291 | −2.9414 | 0.2370 | 1.7043 |
| 28 | 0.0941 | 0.2532 | 0.3333 | 0.4699 | 0.5000 | 0.7429 |
| 29 | 0.3650 | 0.2355 | 0.3271 | 0.0292 | 0.4107 | 0.0423 |
| 30 | 0.2922 | 0.2300 | 0.3210 | 1.3341 | 0.3943 | 0.6955 |
| 31 | 0.3367 | 0.1013 | 0.3509 | −6.5093 | 1.3002 | 9.5790 |
| 32 | 0.3262 | 0.1670 | 0.3095 | −4.0550 | 1.3323 | 2.0309 |
| 33 | 0.2005 | 0.2060 | 0.2751 | 2.1459 | 0.2007 | 2.4545 |
| 34 | 0.1419 | 0.1000 | 0.3472 | −4.0030 | 0.4704 | 4.4250 |
| 35 | 0.1900 | 0.3203 | 0.3316 | −2.0000 | 1.1447 | 1.9740 |
| 36 | 0.5302 | 0.1573 | 0.3534 | −9.3040 | 1.4655 | 11.7649 |
| 37 | 0.2034 | 0.1757 | 0.2407 | −1.3475 | 1.2947 | 1.9230 |
| 38 | 0.0654 | 0.2996 | 0.3256 | −0.3172 | 0.1572 | 0.2051 |
| 39 | 0.2450 | 0.1539 | 0.3540 | −10.1610 | 1.0371 | 9.7023 |
| 40 | 0.0649 | 0.1761 | 0.2342 | −1.5149 | 1.5664 | 1.4167 |
| 41 | 0.4301 | 0.2710 | 0.3479 | −1.4099 | 1.4420 | 5.4172 |
| 42 | 0.1059 | 0.2301 | 0.2635 | 3.1045 | 0.5139 | 3.0364 |

TABLE A3

| | Multi-linear matrix | | | Errors of multi-linear matrix | | |
|---|---|---|---|---|---|---|
| | Y | u | v | Y ind | c ind | $\delta E^*$ |
| 1 | 1.0000 | 0.1970 | 0.3122 | 0.0001 | 0.0009 | 0.0044 |
| 2 | 0.0450 | 0.1090 | 0.1560 | 1.0000 | 0.2330 | 1.0096 |
| 3 | 0.3400 | 0.1406 | 0.2790 | −1.2090 | 0.0147 | 1.3332 |
| 4 | 0.3164 | 0.1314 | 0.3526 | 2.2010 | 1.1406 | 3.1511 |
| 5 | 0.7291 | 0.2110 | 0.3660 | −0.3573 | 0.4497 | 2.1404 |
| 6 | 0.3221 | 0.3505 | 0.3564 | −0.6203 | 1.1243 | 4.2602 |
| 7 | 0.1619 | 0.4230 | 0.3493 | −3.6492 | 1.5653 | 6.2304 |
| 8 | 0.2440 | 0.3747 | 0.3056 | −1.5640 | 1.5301 | 5.2034 |
| 9 | 0.1297 | 0.3102 | 0.2320 | −0.5351 | 1.3701 | 2.2407 |
| 10 | 0.2940 | 0.1912 | 0.2654 | 1.0276 | 0.3016 | 2.3043 |
| 11 | 0.5607 | 0.1751 | 0.3046 | 0.6057 | 0.1559 | 0.7123 |
| 12 | 0.4411 | 0.1003 | 0.3427 | 0.9009 | 0.9703 | 3.3555 |
| 13 | 0.5944 | 0.2077 | 0.3601 | 0.2900 | 1.0242 | 4.3709 |
| 14 | 0.4500 | 0.2535 | 0.3462 | −0.0259 | 0.6945 | 2.5204 |
| 15 | 0.1745 | 0.3211 | 0.3321 | −0.9765 | 0.3752 | 0.6073 |

TABLE A3-continued

| | Multi-linear matrix | | | Errors of multi-linear matrix | | |
|---|---|---|---|---|---|---|
| | Y | u | v | Y ind | c ind | δE* |
| 16 | 0.1772 | 0.3072 | 0.2902 | −0.0730 | 0.6071 | 1.4297 |
| 17 | 0.3271 | 0.2429 | 0.2693 | 3.0930 | 0.4239 | 3.4247 |
| 18 | 0.4340 | 0.2210 | 0.3243 | 0.6440 | 0.3550 | 0.7074 |
| 19 | 0.3000 | 0.2242 | 0.3250 | 0.6206 | 0.3023 | 0.0596 |
| 20 | 0.3346 | 0.2271 | 0.3314 | 0.2495 | 0.4913 | 1.4156 |
| 21 | 0.2111 | 0.2311 | 0.3322 | 0.3010 | 0.5114 | 1.1000 |
| 22 | 0.1190 | 0.2393 | 0.3293 | 0.7177 | 0.4406 | 0.6076 |
| 23 | 0.0679 | 0.2219 | 0.3246 | 0.6301 | 0.3590 | 0.3370 |
| 24 | 0.3251 | 0.2320 | 0.3263 | 0.0370 | 0.4066 | 0.7594 |
| 25 | 0.2060 | 0.2377 | 0.3243 | 1.0072 | 0.3977 | 0.6206 |
| 26 | 0.2323 | 0.1060 | 0.3362 | 0.3313 | 1.4004 | 3.9702 |
| 27 | 0.0652 | 0.1041 | 0.3264 | 0.3229 | 1.1000 | 1.7503 |
| 28 | 0.0941 | 0.2534 | 0.3337 | 0.4993 | 0.3030 | 0.5479 |
| 29 | 0.3650 | 0.2355 | 0.3271 | 0.0292 | 0.4107 | 0.0423 |
| 30 | 0.2922 | 0.2300 | 0.3210 | 1.3341 | 0.3943 | 0.6955 |
| 31 | 0.2939 | 0.1096 | 0.3652 | 0.3594 | 1.5440 | 4.0274 |
| 32 | 0.2912 | 0.1590 | 0.3040 | 1.6739 | 1.3406 | 3.7216 |
| 33 | 0.2005 | 0.2060 | 0.2751 | 2.1459 | 0.2007 | 2.4545 |
| 34 | 0.1275 | 0.1057 | 0.3491 | 0.5074 | 1.3924 | 3.0353 |
| 35 | 0.1931 | 0.3254 | 0.3322 | −0.0122 | 0.4340 | 1.2152 |
| 36 | 0.4163 | 0.1456 | 0.3563 | 2.9119 | 1.6744 | 0.1230 |
| 37 | 0.1907 | 0.1712 | 0.2470 | −0.1051 | 1.7203 | 4.3715 |
| 38 | 0.0654 | 0.2996 | 0.3256 | −0.3172 | 0.1572 | 0.2051 |
| 39 | 0.1090 | 0.1404 | 0.3569 | 2.9066 | 1.7651 | 4.5541 |
| 40 | 0.0635 | 0.1719 | 0.2324 | −0.3021 | 1.9932 | 2.0024 |
| 41 | 0.4340 | 0.2740 | 0.3555 | −0.9436 | 1.3004 | 3.7300 |
| 42 | 0.1059 | 0.2301 | 0.2635 | 3.1045 | 0.5139 | 3.0364 |

TABLE B

Test colours and compatible display errors.

| | | Specification | | | Compatible MAC decoder errors | | |
|---|---|---|---|---|---|---|---|
| | | Y | u' | v' | δL* | δC* | δE* |
| 1 | White | 1.0000 | 0.1978 | 0.4683 | 0.0000 | 0.0000 | 0.0000 |
| 2 | Saturated Blue | 0.0466 | 0.1886 | 0.2352 | −1.7512 | 4.5946 | 4.9170 |
| 3 | Saturated Cyan | 0.3314 | 0.1408 | 0.4139 | −5.1008 | 14.9973 | 15.8409 |
| 4 | Saturated Green | 0.3310 | 0.1357 | 0.5298 | −6.5824 | 6.5173 | 9.2630 |
| 5 | Saturated Yellow | 0.7240 | 0.2093 | 0.5510 | −3.8003 | 9.9807 | 10.6797 |
| 6 | Saturated Orange | 0.3181 | 0.3462 | 0.5351 | −3.0070 | 9.8636 | 10.3118 |
| 7 | Saturated Red | 0.1506 | 0.4212 | 0.5158 | −4.6688 | 13.4671 | 14.2535 |
| 8 | Saturated Pink | 0.2373 | 0.3700 | 0.4530 | −3.2464 | 10.9190 | 11.3914 |
| 9 | Saturated Magenta | 0.1283 | 0.3313 | 0.3414 | 2.2598 | 9.5865 | 9.8483 |
| 10 | Desaturated Blue | 0.3000 | 0.1924 | 0.3969 | 0.5249 | 1.7355 | 1.8132 |
| 11 | Desaturated Cyan | 0.5675 | 0.1756 | 0.4573 | −1.3967 | 3.8411 | 4.0871 |
| 12 | Desaturated Green | 0.4491 | 0.1771 | 0.5169 | −2.7993 | 0.4780 | 2.8398 |
| 13 | Desaturated Yellow | 0.5979 | 0.2051 | 0.5358 | −2.4569 | 5.6142 | 6.1283 |
| 14 | Desaturated Orange | 0.4586 | 0.2541 | 0.5154 | −0.2049 | 3.8170 | 3.8225 |
| 15 | Desaturated Red | 0.1712 | 0.3213 | 0.4961 | −0.7909 | 1.4855 | 1.6829 |
| 16 | Desaturated Pink | 0.1769 | 0.3068 | 0.4439 | −0.1857 | 2.5631 | 2.5698 |
| 17 | Desaturated Magenta | 0.3478 | 0.2427 | 0.4063 | 1.6484 | 1.0850 | 1.9735 |
| 18 | Skin Tone A | 0.4404 | 0.2221 | 0.4884 | 0.3748 | 1.9964 | 2.0313 |
| 19 | Skin Tone B | 0.3936 | 0.2246 | 0.4908 | 0.3475 | 2.0488 | 2.0781 |
| 20 | Skin Tone C | 0.3363 | 0.2280 | 0.4997 | 0.1327 | 2.2937 | 2.2976 |
| 21 | Skin Tone D | 0.2124 | 0.2320 | 0.5008 | 0.1374 | 1.9862 | 1.9910 |
| 22 | Skin Tone E | 0.1207 | 0.2397 | 0.4965 | 0.2709 | 1.4857 | 1.5102 |
| 23 | Skin Tone F | 0.0608 | 0.2223 | 0.4889 | 0.1973 | 0.8910 | 0.9126 |
| 24 | Skin Tone G | 0.3305 | 0.2330 | 0.4917 | 0.4422 | 2.0917 | 2.1379 |
| 25 | Skin Tone H | 0.2922 | 0.2376 | 0.4887 | 0.5503 | 1.9559 | 2.0318 |
| 26 | Light Foliage | 0.2338 | 0.1813 | 0.5091 | −1.7705 | 0.4242 | 1.8206 |
| 27 | Dark Foliage | 0.0656 | 0.1801 | 0.4927 | −0.9171 | 0.6453 | 1.1213 |

TABLE C

HD-MAC channel signals for the test colours.

| | Transmission | | | Compatible MAC decoder | | | Correct drive signals for MAC system | | |
|---|---|---|---|---|---|---|---|---|---|
| | $E'_{Yh}$ | $E'_{Uh}$ | $E'_{Vh}$ | $E'_{Rc}$ | $E'_{Gc}$ | $E'_{Bc}$ | $E'_{Rm}$ | $E'_{Gm}$ | $E'_{Bm}$ |
| 1 | 1.000 | 0.000 | 0.000 | 1.000 | 1.000 | 1.000 | 1.000 | 1.000 | 1.000 |
| 2 | 0.252 | 0.268 | −0.061 | 0.186 | 0.214 | 0.617 | 0.218 | 0.171 | 0.625 |
| 3 | 0.608 | 0.152 | −0.268 | 0.319 | 0.715 | 0.816 | 0.044 | 0.665 | 0.823 |
| 4 | 0.608 | −0.153 | −0.200 | 0.392 | 0.758 | 0.400 | 0.258 | 0.693 | 0.361 |
| 5 | 0.865 | −0.399 | 0.062 | 0.931 | 0.937 | 0.320 | 0.920 | 0.886 | 0.028 |
| 6 | 0.597 | −0.299 | 0.368 | 0.995 | 0.474 | 0.189 | 0.980 | 0.425 | 0.008 |
| 7 | 0.427 | −0.181 | 0.378 | 0.834 | 0.267 | 0.180 | 0.808 | 0.154 | 0.160 |
| 8 | 0.523 | −0.014 | 0.412 | 0.968 | 0.301 | 0.504 | 0.949 | 0.214 | 0.518 |
| 9 | 0.397 | 0.191 | 0.268 | 0.686 | 0.199 | 0.657 | 0.690 | 0.062 | 0.673 |
| 10 | 0.582 | 0.172 | −0.034 | 0.545 | 0.555 | 0.817 | 0.556 | 0.558 | 0.828 |
| 11 | 0.775 | 0.045 | −0.106 | 0.661 | 0.821 | 0.836 | 0.637 | 0.806 | 0.838 |
| 12 | 0.698 | −0.149 | −0.068 | 0.624 | 0.774 | 0.495 | 0.597 | 0.743 | 0.466 |
| 13 | 0.793 | −0.273 | 0.040 | 0.836 | 0.844 | 0.421 | 0.827 | 0.812 | 0.351 |
| 14 | 0.704 | −0.184 | 0.193 | 0.912 | 0.647 | 0.453 | 0.915 | 0.744 | 0.427 |
| 15 | 0.452 | −0.093 | 0.252 | 0.724 | 0.338 | 0.325 | 0.719 | 0.327 | 0.322 |
| 16 | 0.459 | 0.022 | 0.248 | 0.726 | 0.316 | 0.489 | 0.727 | 0.310 | 0.498 |
| 17 | 0.622 | 0.147 | 0.156 | 0.790 | 0.497 | 0.822 | 0.810 | 0.514 | 0.836 |
| 18 | 0.691 | −0.071 | 0.090 | 0.788 | 0.661 | 0.594 | 0.794 | 0.665 | 0.588 |
| 19 | 0.657 | −0.076 | 0.094 | 0.758 | 0.626 | 0.554 | 0.763 | 0.630 | 0.547 |
| 20 | 0.612 | −0.098 | 0.097 | 0.717 | 0.585 | 0.478 | 0.721 | 0.586 | 0.467 |
| 21 | 0.498 | −0.084 | 0.088 | 0.593 | 0.472 | 0.383 | 0.597 | 0.473 | 0.374 |
| 22 | 0.386 | −0.059 | 0.082 | 0.475 | 0.356 | 0.306 | 0.479 | 0.359 | 0.300 |
| 23 | 0.300 | −0.032 | 0.039 | 0.342 | 0.287 | 0.257 | 0.345 | 0.288 | 0.254 |
| 24 | 0.608 | −0.076 | 0.111 | 0.727 | 0.567 | 0.504 | 0.733 | 0.572 | 0.497 |
| 25 | 0.575 | −0.065 | 0.118 | 0.702 | 0.527 | 0.486 | 0.708 | 0.534 | 0.481 |
| 26 | 0.520 | −0.092 | −0.040 | 0.476 | 0.566 | 0.395 | 0.460 | 0.548 | 0.379 |
| 27 | 0.293 | −0.029 | −0.027 | 0.265 | 0.316 | 0.254 | 0.256 | 0.308 | 0.250 |

TABLE D

Modified compatible signals and resultant colour errors.

| | Modified signals | | | Output | | | Errors | | |
|---|---|---|---|---|---|---|---|---|---|
| | $E'_R$ | $E'_G$ | $E'_B$ | Y | u' | v' | δL* | δC* | δE* |
| 1 | 1.0000 | 1.0000 | 1.0000 | 1.0000 | 0.1978 | 0.4683 | 0.00 | 0.00 | 0.00 |
| 2 | 0.2254 | 0.1666 | 0.6172 | 0.0457 | 0.1908 | 0.2360 | 0.28 | 1.35 | 1.38 |
| 3 | 0.1522 | 0.6737 | 0.8158 | 0.3426 | 0.1425 | 0.4192 | −0.89 | 3.95 | 4.05 |
| 4 | 0.2426 | 0.6830 | 0.3588 | 0.3197 | 0.1348 | 0.5292 | 0.92 | 1.19 | 1.51 |
| 5 | 0.9313 | 0.8855 | 0.1492 | 0.7299 | 0.2108 | 0.5489 | −0.28 | 2.78 | 2.79 |

TABLE D-continued

| | Modified compatible signals and resultant colour errors. | | | | | | | | |
|---|---|---|---|---|---|---|---|---|---|
| | Modified signals | | | Output | | | Errors | | |
| | E'$_R$ | E'$_G$ | E'$_B$ | Y | u' | v' | δL* | δC* | δE* |
| 6 | 0.9784 | 0.4018 | 0.1023 | 0.3051 | 0.3538 | 0.5322 | 1.09 | 5.15 | 5.27 |
| 7 | 0.8113 | 0.1623 | 0.1611 | 0.1531 | 0.4188 | 0.5161 | −0.35 | 0.58 | 0.67 |
| 8 | 0.9671 | 0.1993 | 0.5044 | 0.2413 | 0.3774 | 0.4572 | −0.40 | 6.96 | 6.97 |
| 9 | 0.6939 | 0.1013 | 0.6574 | 0.1310 | 0.3130 | 0.3502 | −0.41 | 4.50 | 4.52 |
| 10 | 0.5446 | 0.5549 | 0.8169 | 0.2940 | 0.1912 | 0.3981 | 0.52 | 1.74 | 1.81 |
| 11 | 0.6589 | 0.8023 | 0.8360 | 0.5689 | 0.1786 | 0.4577 | −0.08 | 3.10 | 3.10 |
| 12 | 0.6192 | 0.7324 | 0.4949 | 0.4452 | 0.1820 | 0.5110 | 0.26 | 7.38 | 7.39 |
| 13 | 0.8364 | 0.8083 | 0.3549 | 0.5967 | 0.2073 | 0.5351 | 0.07 | 2.47 | 2.47 |
| 14 | 0.9118 | 0.6471 | 0.4527 | 0.4618 | 0.2519 | 0.5119 | −0.20 | 3.82 | 3.82 |
| 15 | 0.7237 | 0.3136 | 0.3251 | 0.1678 | 0.3276 | 0.4938 | 0.43 | 3.62 | 3.65 |
| 16 | 0.7263 | 0.3065 | 0.4888 | 0.1747 | 0.3093 | 0.4460 | 0.27 | 1.89 | 1.91 |
| 17 | 0.7900 | 0.4972 | 0.8218 | 0.3271 | 0.2429 | 0.4039 | 1.65 | 1.09 | 1.97 |
| 18 | 0.7884 | 0.6608 | 0.5943 | 0.4348 | 0.2218 | 0.4864 | 0.37 | 2.00 | 2.03 |
| 19 | 0.7582 | 0.6261 | 0.5536 | 0.3888 | 0.2242 | 0.4887 | 0.35 | 2.05 | 2.08 |
| 20 | 0.7169 | 0.5852 | 0.4784 | 0.3346 | 0.2271 | 0.4971 | 0.13 | 2.29 | 2.30 |
| 21 | 0.5931 | 0.4719 | 0.3832 | 0.2111 | 0.2311 | 0.4982 | 0.14 | 1.99 | 1.99 |
| 22 | 0.4751 | 0.3564 | 0.3058 | 0.1190 | 0.2393 | 0.4940 | 0.27 | 1.49 | 1.51 |
| 23 | 0.3423 | 0.2866 | 0.2568 | 0.0679 | 0.2219 | 0.4869 | 0.20 | 0.89 | 0.91 |
| 24 | 0.7274 | 0.5667 | 0.5039 | 0.3251 | 0.2328 | 0.4894 | 0.44 | 2.09 | 2.14 |
| 25 | 0.7021 | 0.5274 | 0.4856 | 0.2860 | 0.2377 | 0.4864 | 0.55 | 1.96 | 2.03 |
| 26 | 0.4765 | 0.5411 | 0.3949 | 0.2323 | 0.1860 | 0.5043 | 0.16 | 4.91 | 4.91 |
| 27 | 0.2646 | 0.3043 | 0.2543 | 0.0652 | 0.1843 | 0.4897 | 0.09 | 2.10 | 2.11 |

I claim:

1. Video display apparatus comprising:
   inputs for receiving input signals comprising a luminance input signal and two chrominance input signals;
   a display device for displaying an image derived from the input signals and adapted to receive three colour component signals;
   decoding matrix means coupled between the inputs and the display device to provide a linear transformation between the input signals and the three colour component signals; and
   correction matrix means coupled to receive the input signals and providing outputs to the decoding matrix means to modify the output thereof, the correction matrix means comprising a plurality of matrix sections, there being at least one section for each colour component signal and at least two sections for at least one of the colour component signals, each matrix section being operative over only a portion of a permissible colour range and being inoperative over the rest of the permissible colour range.

2. Apparatus according to claim 1, in which the display means comprises a cathode ray tube.

3. Apparatus according to claim 1, including buffer amplifiers connected to the inputs and providing dual outputs of opposite polarity.

4. Apparatus according to claim 1, in which there are three circuit sections associated with a green colour component.

5. Apparatus according to claim 4, in which there are two circuit sections associated with a red colour component and one circuit section associated with a blue colour component.

6. Apparatus according to claim 4, in which there are three circuit sections associated with a red colour component and two circuit sections associated with a blue colour component.

7. Apparatus according to claim 1, in which each circuit section comprises three input resistors, an operational amplifier having its input coupled to the three resistors, a first diode and a resistor connected in series between the output and the input of the amplifier, and a second diode and a resistor connected in series between the output and the input of the amplifier with the second diode being oppositely directed to the first diode, the output of the circuit section being taken from the output of the first diode.

8. Video display apparatus comprising:
   three inputs for receiving input signals comprising a luminance input signal and two chrominance input signals;
   a display device for displaying an image derived from the input signals and adapted to receive three colour component signals;
   decoding matrix means coupled between the inputs and the display device to provide a linear transformation between the input signals and the three colour component signals; the decoding matrix means including three amplifier means and input resistor means coupled between the three inputs and the three amplifier means whereby two amplifier means are each coupled to the luminance input and a respective one of the chrominance inputs and the third amplifier means is coupled to all of said three inputs; and
   correction matrix means coupled to receive the input signals and providing outputs to the decoding matrix means, the correction matrix means comprising a plurality of matrix sections, each matrix section comprising three input resistor means coupled to the three inputs respectively, operational amplifier means having its input coupled to the three resistor means, and means coupled to an output of the operational amplifier means to utilize the output thereof in response to a predefined inequality, and further comprising additional resistance-means coupling the output of each matrix section to the input of a corresponding one of the amplifier means in the decoding matrix means.

9. Apparatus according to claim 8, in which the display means comprises a cathode ray tube.

10. Apparatus according to claim 8, including buffer amplifiers connected to the inputs and providing dual outputs of opposite polarity.

11. Apparatus according to claim 8, in which there are three circuit sections associated with a green colour component.

12. Apparatus according to claim 11, in which there are two circuit sections associated with a red colour component and one circuit section associated with a blue colour component.

13. Apparatus according to claim 11, in which there are three circuit sections associated with a red colour component and two circuit sections associated with a blue colour component.

14. Apparatus according to claim 8, in which each circuit section further comprises a first diode and a resistor connected in series between the output and the input of the operational amplifier means, and a second diode and a resistor connected in series between the output and the input of the operational amplifier means with the second diode being oppositely directed to the first diode, the output of the matrix section being taken from the output of the first diode.

15. A method of selectively displaying received video signals on a video display device, the received signals comprising a luminance input signal and two chrominance input signals, a first received signal being derived in accordance with constant luminance principles and a second received signal not being derived in accordance with constant luminance principles, said display device exhibiting a non-unity gamma factor, the method comprising the steps of when receiving the second received signal, applying the second received signal through a decoding matrix, to the display device, and when receiving the first received signal, adding a correction matrix to the decoding matrix, and applying the second received signal through the added correction matrix to the display device, the correction matrix comprising a plurality of matrix sections, there being at least one section for each colour component signal and at least two sections for at least one of the colour component signals, each matrix section being operative over only a portion of a permissible colour range and being inoperative over the rest of the permissible colour range.

* * * * *